(12) United States Patent
Okumura

(10) Patent No.: US 7,583,892 B2
(45) Date of Patent: Sep. 1, 2009

(54) FINDER DEVICE AND CAMERA

(75) Inventor: Yoichiro Okumura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 507 days.

(21) Appl. No.: 11/443,672

(22) Filed: May 31, 2006

(65) Prior Publication Data

US 2006/0280495 A1    Dec. 14, 2006

(30) Foreign Application Priority Data

Jun. 8, 2005    (JP) .............................. 2005-168267

(51) Int. Cl.
G03B 13/02    (2006.01)
(52) U.S. Cl. ...................... 396/282; 348/341
(58) Field of Classification Search ................. 396/282; 348/341
See application file for complete search history.

(56) References Cited

U.S. PATENT DOCUMENTS

| | | | |
|---|---|---|---|
| 4,367,463 A * | 1/1983 | Suzuki et al. ................... | 345/9 |
| 4,704,022 A | 11/1987 | Nozawa et al. | |
| 5,485,241 A * | 1/1996 | Irie et al. ....................... | 396/51 |
| 6,639,626 B1 | 10/2003 | Kubo et al. | |
| 2002/0191097 A1 | 12/2002 | Kobayashi | |
| 2003/0198466 A1* | 10/2003 | Bianchi et al. .............. | 396/282 |
| 2005/0237384 A1* | 10/2005 | Jess et al. ..................... | 348/42 |

FOREIGN PATENT DOCUMENTS

| | | |
|---|---|---|
| JP | 10-142685 | 5/1998 |
| JP | 2000-013661 | 1/2000 |
| JP | 2000-165730 | 6/2000 |
| JP | 2001-078069 | 3/2001 |
| JP | 2001-125173 | 5/2001 |
| JP | 2001-222059 | 8/2001 |
| JP | 2002-182268 | 6/2002 |
| JP | 2002-290780 | 10/2002 |
| JP | 2002-369042 | 12/2002 |
| JP | 2005-010643 | 1/2005 |
| JP | 2006-11025 | 1/2006 |

* cited by examiner

*Primary Examiner*—W. B. Perkey
*Assistant Examiner*—Fang-Chi Chang
(74) *Attorney, Agent, or Firm*—Straub & Pokotylo; John C. Pokotylo

(57) ABSTRACT

The present invention discloses a finder device capable of adjusting the amount of light emitted from a light-emitting display section arranged in the device according to the light-receiving level of an image pickup device. The amount of light emitted is adjusted, for example, so that the light-receiving level of the image pickup device is not saturated. The light-emitting display section can be configured, for example, to include a LED display element for projecting light onto a mat screen in the finder device and a drive circuit that can adjust the amount of LED light, or to include an LCD display unit provided adjacent to the mat screen and a backlight unit that can adjust the amount of light for the LCD unit.

11 Claims, 8 Drawing Sheets

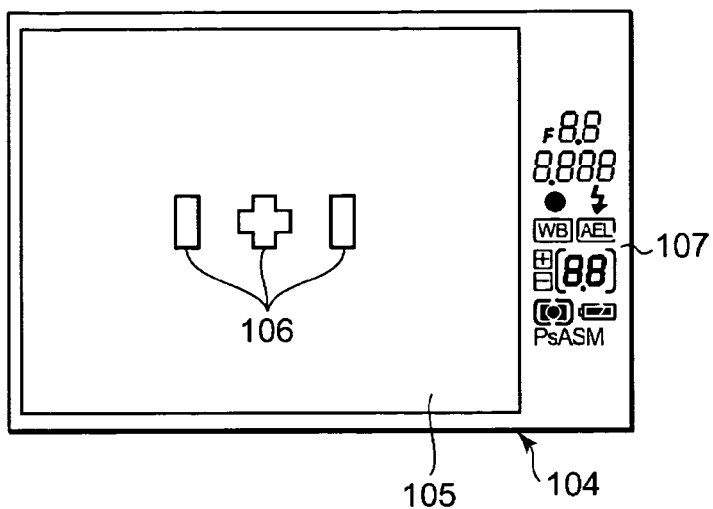
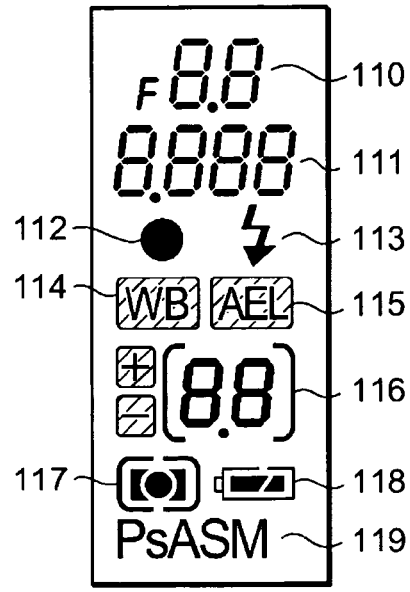
Fig. 5A      Fig. 5B
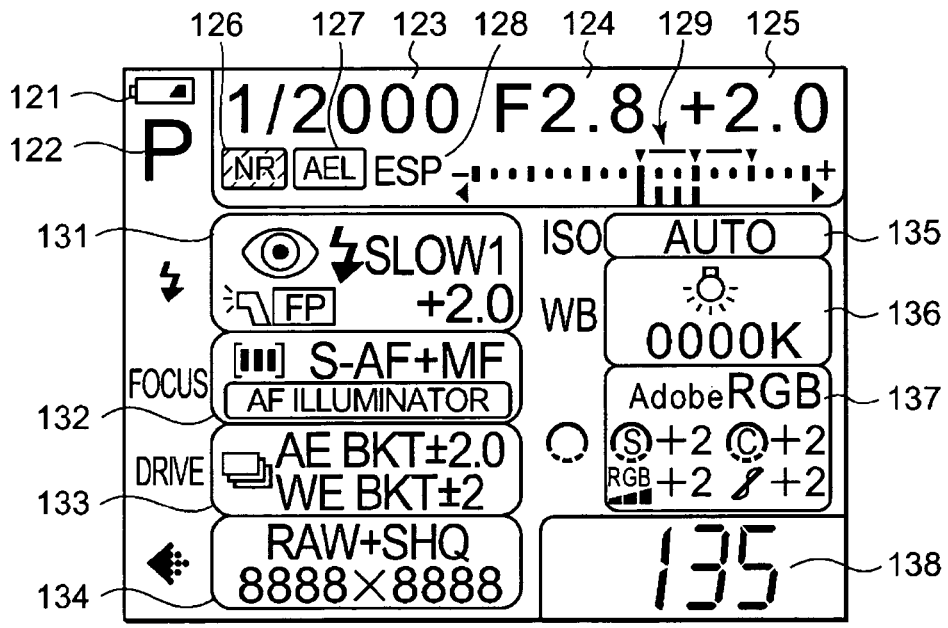
Fig. 6

FINDER DEVICE AND CAMERA

CROSS-REFERENCE TO RELATED APPLICATION

This application is based upon and claims the benefit of priority from prior Japanese Patent Application No. 2005-168267, filed on Jun. 8, 2006, the entire contents of which are incorporated herein by reference.

BACKGROUND OF THE INVENTION

1. Field of the Invention

The present invention relates to a finder device. More particularly, the present invention relates to the improvement of a finder device in a digital camera capable of displaying on a display screen both an image being viewed and an image being shot.

2. Description of the Related Art

Cameras are commonly known, which form an optical image of a subject on an image pickup device from light coming from the subject and passing through a photographing optical system, photoelectrically convert the optical image into electric image signals through the image pickup device, and display the resulting image on the screen of an image display device, such as an LCD monitor, based on the electric image signals.

As an example of such a camera displaying a subject image, a camera is known, which is provided with an image pickup device for monitoring the subject field (image pickup device for live-view display) separately from an image pickup device for capturing the subject image. In this type of camera, a half mirror is arranged in a finder optical system to guide a light beam of the subject to the image pickup device for live-view display. In a live view mode that is one of the operation modes of the camera, the image pickup device for live-view display repeats imaging to display a series of live images on the screen of an image display device (for example, see Japanese Patent Laid-Open No. 2000-165730).

A technique is also known which uses another image pickup device, different from an image pickup device for capturing a subject image, to monitor a finder screen (for example, see the U.S. Pat. No. 4,704,022).

It is common practice for conventional single lens reflex cameras (hereinafter simply called "SLR cameras") to cause a superimpose display for displaying multiple focus points in a viewfinder or to display shooting information in the viewfinder using a display component for finder display.

However, the camera described in Japanese Patent Laid-Open No. 2000-165730 is not to display shooting information and a subject image at a time on the screen of the display device.

On the other hand, when a finder screen is monitored through another image pickup device as described in the U.S. Pat. No. 4,704,022, there may be cases where the brightness of the display component for finder display does not fit the brightness of the subject on the finder screen.

BRIEF SUMMARY OF THE INVENTION

The finder device of the present invention is such that a light-emitting display section (light-emitting display device) arranged in the finder device adjusts the amount of light emitted therefrom depending on the light-receiving level of an image pickup device (imaging device).

For example, the amount of light is adjusted so that the light-receiving level of the image pickup device is not saturated.

According to one aspect of the present invention, there is provided a finder device comprising: a mat screen arranged in a finder optical path on which a subject image is formed; an imaging section for acquiring a finder image including the subject image on the mat screen; an image display section for displaying image data acquired by the imaging section; and a light-emitting display section arranged in the finder, wherein the light-emitting display section can adjust the amount of light emitted therefrom so that the light-receiving level of the imaging section is not saturated during the light-emitting display.

The light-emitting display section can be configured, for example, to include a LED display element for projecting light onto the mat screen in the finder device and a drive circuit that can adjust the amount of LED light, or to include an LCD unit provided adjacent to the mat screen and a backlight unit that can adjust the amount of light for the LCD unit.

Further, when the finder device has an imaging section that can adjust its imaging sensitivity automatically according to the brightness of a subject, the light-emitting display section is preferably configured to be able to adjust the amount of light emitted therefrom according to the imaging sensitivity of the imaging section.

The present invention can also be understood as a camera provided with the finder device configured as mentioned above.

According to the present invention, a finder device and a camera can be provided which can prevent the display of a subject image and the display of shooting information and the like from being difficult to see.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 5A shows an example of a display screen 104 in a viewfinder, in which the display screen corresponds to a focusing screen 56;

FIG. 5B shows a display example of an LCD display panel 64 in the viewfinder;

FIG. 6 shows a display example in which exposure information is displayed on the LCD monitor 36;

DETAILED DESCRIPTION OF THE PREFERRED EMBODIMENTS

A preferred embodiment of the invention is described below with reference to the accompanying drawings.

Figure 1:
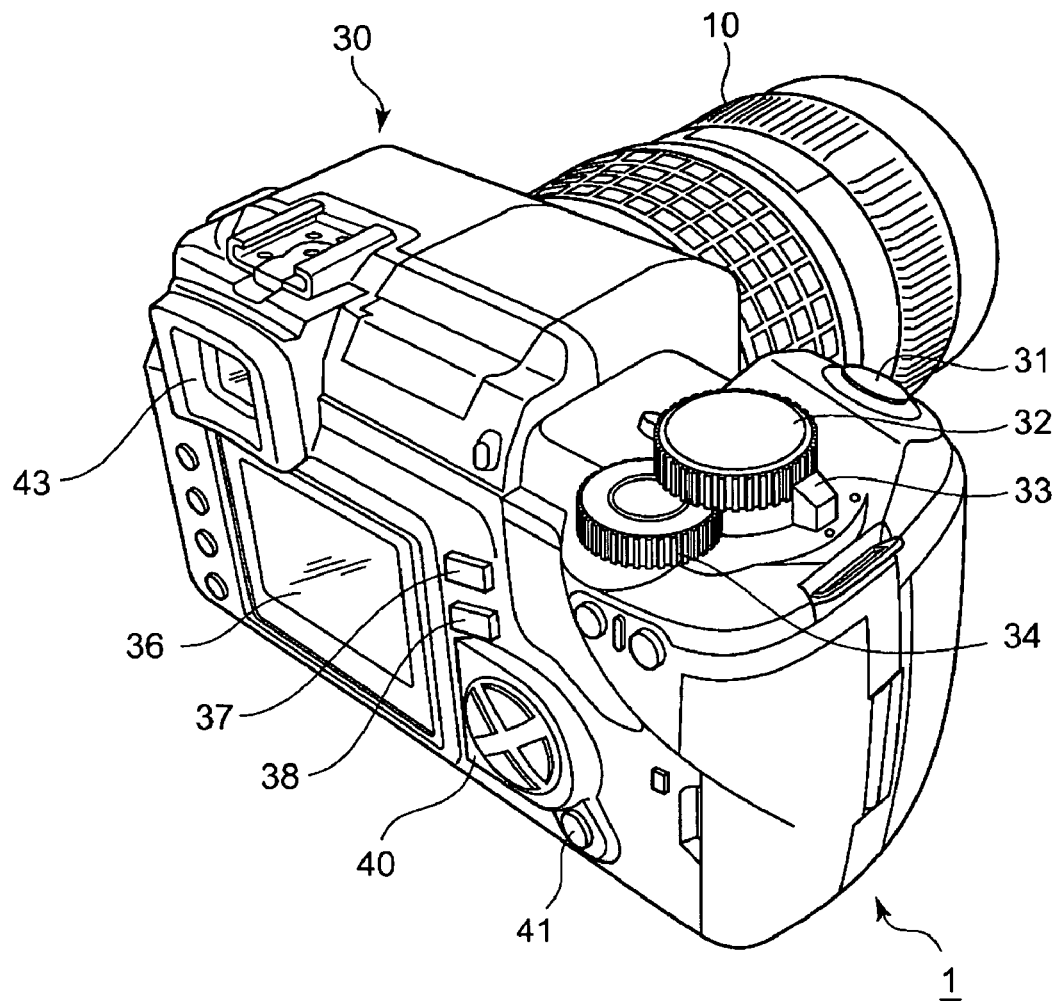
FIG. 1 is an outline perspective view showing the structure of a single-lens reflex digital camera to which a finder device according to a preferred embodiment of the present invention is applied.

FIG. 1 is an outline perspective view showing the structure of a single-lens reflex digital camera to which a finder device according to a preferred embodiment of the present invention is applied.

In FIG. 1, the single-lens reflex digital camera (hereinafter simply called the "camera") 1 consists principally of an interchangeable lens barrel 10 and a camera body 30. In this structure, a desired lens barrel 10 is removably mounted on the front of the camera body 30.

A shutter button 31, a mode dial 32, a power switch lever 33, a control dial 34, etc. are provided on the top face of the camera body 30.

The shutter button 31 is to perform shooting preparation and exposure operations. The shutter button 31 consists of two-step switches, namely a first shutter release switch and a second shutter release switch. When the shutter button 31 is pressed halfway, the first shutter release switch is turned on to perform shooting preparation operations, such as photometering and distance measuring. Then, when the shutter button 31 is pressed fully, the second shutter release switch is turned on to make an exposure.

The mode dial 32 is an operation part for allowing a user to set a shooting mode upon shooting. The mode dial 32 is rotated in a predetermined direction to set a shooting mode upon shooting. In the embodiment, the mode dial 32 also has a function for switching over the image display in an LCD monitor between a finder mode and a live-view mode as described in detail later. The power switch lever 33 is an operation part for allowing the user to power on or off the camera 1. When the power switch lever 33 is moved, the main power supply of the camera 1 is turned on or off.

The control dial 34 is an operation part for allowing the user to set shooting information. The user can set various shooting conditions upon shooting by operating the control dial 34.

Further, an LCD monitor 36 as an image display section for displaying a shooting image, a menu, etc., a playback button 37, a menu button 38, an arrow pad 40, an OK button 41, a viewfinder 43 in an eyepiece optical system, etc. are arranged on the back face of the camera body 30.

The playback button 37 is to switch over the camera 1 to a playback mode capable of playing back a JPEG image file recorded in a flash memory 84 or on a recording medium 85 as described in detail later. The menu button 38 is to display a menu screen on the LCD monitor 36. The menu screen consists of menu items in a multi-layered structure. The user can select a desired menu item using the arrow pad 40 and confirm the selected item by pressing the OK button 41.

Figure 2:
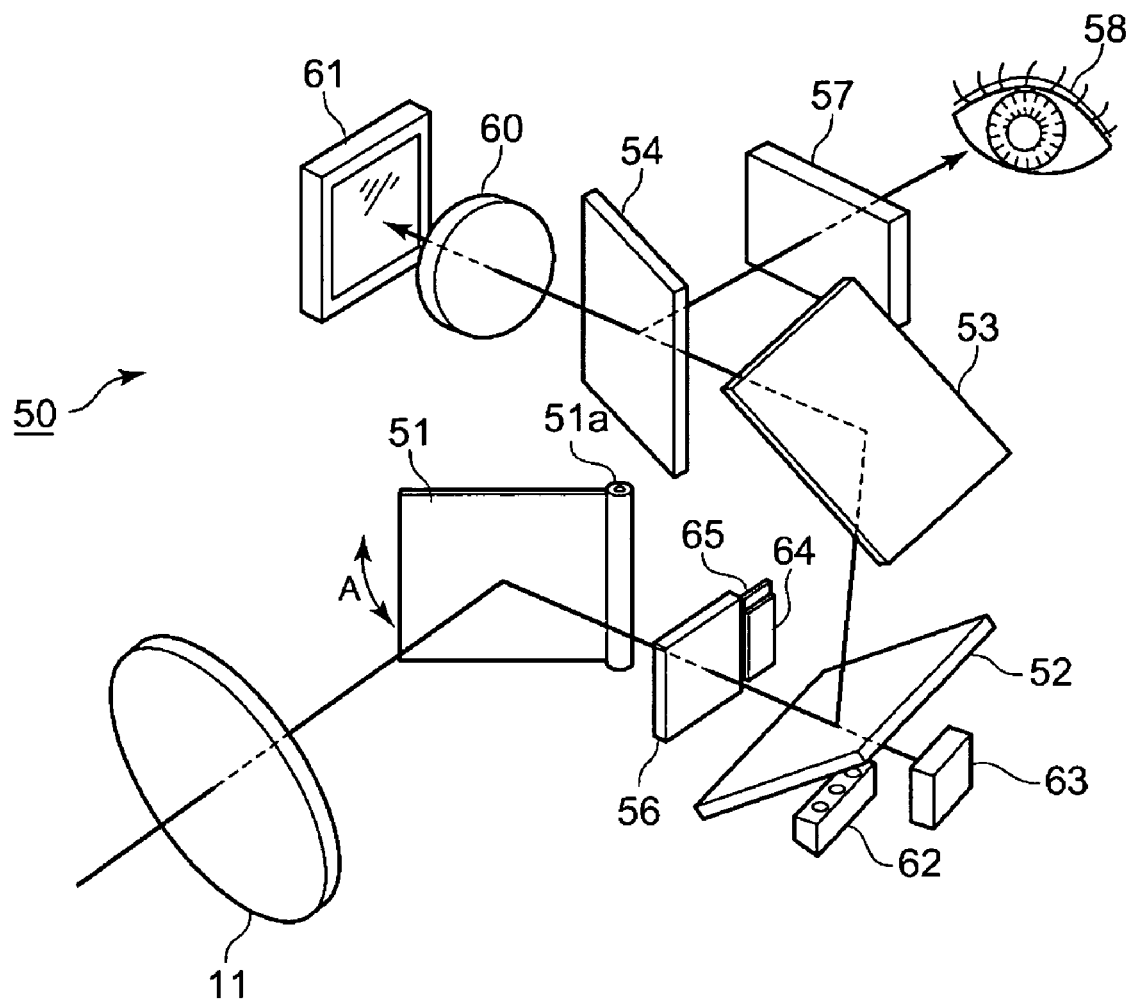
FIG. 2 is a perspective view showing the structure of a finder optical system of the camera according to the embodiment of the present invention.

FIG. 2 is a perspective view showing the structure of a finder optical system of the camera according to the embodiment of the present invention.

A finder optical system 50 includes a plurality of mirrors for guiding a light beam coming from a subject and passing through a photographing lens 11 in the lens barrel 10 to an eyepiece lens 57 constituting part of the viewfinder 43, a focusing screen (matt screen) 56, and the eyepiece lens 57.

The plurality of mirrors include a first reflection mirror 51, a second reflection mirror 52, a third reflection mirror 53, and a fourth reflection mirror 54.

The first reflection mirror 51 is rotatable about an axis 51a in both directions indicated by arrow A in FIG. 2. Part of the first reflection mirror 51 is formed into a half mirror for an AF sensor unit 71 (see FIG. 3) to be described later. As shown, when a photographer is looking into the viewfinder 43 (FIG. 1) to observe a subject before shooting, the first reflection mirror 51 reflects a light beam incoming from the photographing lens 11 toward the second reflection mirror 52, at an angle of approximately 90° with respect to the optical axis of the photographing lens 11, that is, to the right in the camera body 30 as viewed from the lens barrel 10. Then, upon shooting, the first reflection mirror 51 is withdrawn out of the photographing optical path so that the light beam from the subject will be guided to an image pickup device 67 (see FIG. 3) located behind the first reflection mirror 51.

The light beam reflected on the reflection surface of the first reflection mirror 51 is incident on the second reflection mirror 52 through the focusing screen 56. The second reflection mirror 52 is arranged in the optical axis of the reflected light from the first reflection mirror 51 and with its reflection surface tilted at a predetermined angle with respect to the optical axis of the reflected light from the first reflection mirror 51. The light beam reflected from the first reflection mirror 51 and incident on the second reflection mirror 52 is reflected upward in the camera body 30 at an angle of approximately 90° with respect to the optical axis of the reflected light from the first reflection mirror 51.

The light beam reflected on the reflection surface of the second reflection mirror 52 is incident on the third reflection mirror 53 arranged in the reflective optical axis of the reflection surface of the second reflection mirror 52 and with its reflection surface tilted at a predetermined angle with respect to the reflective optical axis of the reflection surface of the second reflection mirror 52. The light beam reflected from the second reflection mirror 52 and incident on the third reflection mirror 53 is reflected on the reflection surface of the third reflection mirror 53 at an angle of approximately 90° with respect to the reflective optical axis of the reflection surface of the second reflection mirror 52 in a direction opposite to the reflective direction of the reflection surface of the first reflection mirror 51. In other words, the light beam reflected from the reflection surface of the second reflection mirror 52 is reflected on the reflection surface of the third reflection mirror 53 to the left in the camera body 30. To sum up, the light beam reflected on the reflection surface of the first reflection mirror 51 is guided through the second and third reflection mirrors 52 and 53 as if it is turned back, and directed toward the fourth reflection mirror 54 because the reflective optical axis of the reflection surface of the third reflection mirror 53 is almost parallel to that of first reflection mirror 51.

The light beam reflected on the reflection surface of the third reflection mirror 53 is incident on the fourth reflection mirror 54 arranged in the reflective optical axis of the reflection surface of the third reflection mirror 53 and with its reflection surface tilted at a predetermined angle with respect to the reflective optical axis of the reflection surface of the third reflection mirror 53. Then, the light beam reflected from third reflection mirror 53 and incident on the fourth reflection mirror 54 is reflected on the reflection surface of the fourth reflection mirror 54 at an angle of approximately 90° with respect to the reflective optical axis of the reflected light from the third reflection mirror 53. In other words, the light beam reflected from the reflection surface of the fourth reflection mirror 54 is incident on the eyepiece lens 57 arranged on the reflective optical axis of the reflection surface of the fourth reflection mirror 54.

The focusing screen 56 has a diffusing surface for diffusing the light beam incident on it to form an optical image from the light beam incident in the finder optical system 50. The focusing screen 56 is arranged in a position optically equivalent to the imaging plane of the image pickup device 67 (see FIG. 3) for capturing an image upon shooting. Further, an LCD display panel 64 inside the viewfinder (F) and a backlight LED unit 65 as a light-emitting display section for illuminating the LCD display panel 64 are provided adjacent to the focusing screen 56.

The second reflection mirror 52 and the fourth reflection mirror 54 are half mirrors. A set of focus point indicator LEDs 62 as another light-emitting display section and a photometric sensor 63 are arranged on the backside of the reflection surface of the second reflection mirror 52. The set of focus point indicator LEDs 62 is to cause a superimpose display to indicate where a focus point is located on the screen in the viewfinder or the LCD monitor 36. On the other hand, an imaging lens 60 and an image pickup device 61 for producing a series of live images (for live-view display) are provided on the backside of the reflection surface of the fourth reflection mirror 54. The image pickup device 61 for live-view display is to capture an image on the focusing screen 56 through the imaging lens 60. Therefore, the image formed on the image pickup device 61 for live-view display is the same as that observed by a photographer's eye 58 except that the image formed on the image pickup device 61 is reversed left to right.

The light beam of the subject from the photographing lens 11 is guided to the eyepiece lens 57 through the first to fourth reflection mirrors 51-54 so that the image in the viewfinder 43 will be an erect-unreversed image. Thus, the subject image formed on the focusing screen 56 can be observed by the photographer's eye through the eyepiece lens 57 (viewfinder 43).

In the embodiment, the first reflection mirror 51, the second reflection mirror 52, the third reflection mirror 53, and the fourth reflection mirror 54 are all arranged to reflect the incident light beam at an angle of approximately 90°, but the present invention is not limited to this arrangement.

Figure 3:
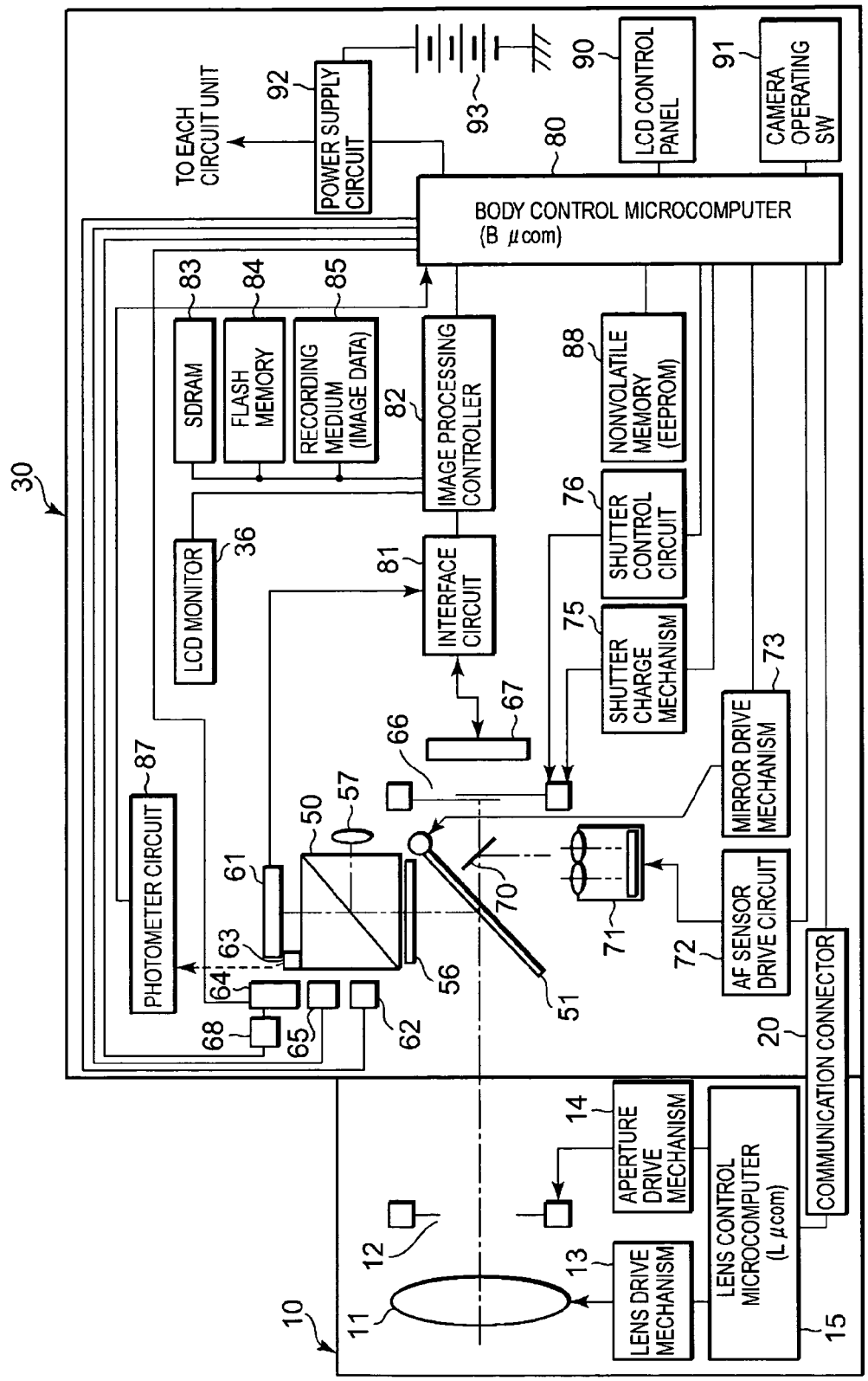
FIG. 3 is a block diagram showing a system configuration of the camera according to the embodiment of the present invention.

FIG. 3 is a block diagram showing a system configuration of the camera according to the embodiment of the present invention.

In FIG. 3, the lens barrel 10 is removably mounted on the camera body 30 through a mount, not shown, provided on the front face of the camera body 30. The lens barrel 10 includes the photographing lens 11, an aperture 12, a lens drive mechanism 13, an aperture drive mechanism 14, and a lens control microcomputer (hereinafter abbreviated as "L μcom") 15.

The photographing lens 11 is driven along its optical axis by a DC motor (not shown) provided in the lens drive mechanism 13. The aperture 12 is driven by a stepping motor (not shown) provided in the aperture drive mechanism 14. The L μcom 15 controls each component in the lens barrel 10, such as the lens drive mechanism 13 and the aperture drive mechanism 14. The L μcom 15 is electrically connected to a body control microcomputer (hereinafter abbreviated as "B μcom") 80 to be described later through a communication connector 20 so that it is controlled in accordance with instructions from the B μcom 80.

The camera body 30 is configured as follows.

A light beam from a subject, not shown, passing through the photographing lens 11 and the aperture 12 in the lens barrel 10 is reflected by the first reflection mirror 51 as a movable mirror to reach the eyepiece lens 57 through the second to fourth reflection mirrors (see FIG. 2). On the other hand, part of the light beam from the subject passes through the half mirror portion of the first reflection mirror 51, is reflected by a sub-mirror 70 movable independently of the first reflection mirror 51, and is guided to an AF sensor unit 71 for automatic distance measurement. In FIG. 3, although the first reflection mirror 51 is shown separately from the second to fourth reflection mirrors, it constitutes part of the finder optical system 50 together with the second to fourth reflection mirrors.

A focal-plane type shutter 66 and the image pickup device 67 for capturing an image upon shooting (hereinafter simply called "for image capturing") are provided behind the first reflection mirror 51 along the optical axis. The image pickup device 67 for image capturing is a photoelectric converter in an imaging optical system, such as a CCD, for photoelectrical conversion of light from a subject passing through the optical system to produce a subject image. In other words, when the first reflection mirror 51 is withdrawn out of the optical path, the light beam passing through the photographing lens 11 and the aperture 12 forms an image on the imaging plane of the image pickup device 67 for image capturing.

The set of AF point indicator LEDs 62, the LCD panel 64 in the viewfinder, and the backlight LED unit 65 are arranged near the focusing screen 56. The LCD display panel 64 in the viewfinder is driven by an LCD driver 68, and controlled together with the back light LED unit 65 in accordance with instructions from the B μcom 80 to be described later.

Further, as mentioned above, the finder optical system 50 is configured such that elements constituting the AF point indicator LEDs 62, for example, three-color LEDs 62a-62c, are arranged near the second reflection mirror 52, and the image pickup device 61 for live-view display is arranged near the fourth reflection mirror 54. Together with the LCD display panel 64 and the back light LED unit 65, the LEDs 62a-62c are connected to the B μcom 80 and controlled in accordance with instructions from the B μcom 80.

The image pickup device 61 for live-view display and the image pickup device 67 for image capturing are connected to an image processing controller 82 for image processing through an interface circuit 81. The LCD monitor 36 is also connected to the image processing controller 82. An SDRAM 83, the flash memory 84, the recording medium 85, etc. as memory areas are further connected to the image processing controller 82. The LCD monitor 36 and these memory areas are configured to allow the camera to provide an electronic recording/display function as well as an electronic imaging function.

The recording medium 85 is an external recording medium such as one of various types of memory cards removably inserted into the camera body 30 through a camera interface, not shown, or an external hard disk drive (HDD).

The image processing controller 82 is connected to the B μcom 80 for controlling each component of the camera body 30. A photometer circuit 87 including the photometric sensor 63, an AF sensor drive circuit 72, a mirror drive mechanism 73, a shutter charge mechanism 75, a shutter control circuit 76, and a nonvolatile memory (EEPROM) 88 are also connected to the B μcom 80.

An LCD control panel 90 for providing a display screen to the photographer to show the operating state of the camera, a camera operating-switch part (SW) 91, and a battery 93 through a power supply circuit 92 are further connected to the B μcom 80.

The B μcom 80 and the L μcom 15 are electrically connected through the communication connector 20 when the lens barrel 10 is mounted on the camera body 30. The L μcom 15 cooperates dependently with the B μcom 80 to operate in the digital camera.

The AF sensor drive circuit 72 is to control the drive of the AF sensor unit 71, and the mirror drive mechanism 73 is to control the drive of the first reflection mirror 51. The shutter charge mechanism 75 is to charge a spring for driving front and rear curtains (both not shown here) constituting the shutter 66. The shutter control circuit 76 not only controls the traveling of the front and rear curtains of the shutter 66, but also exchanges with the B μcom 80 a signal for controlling the opening/closing of the shutter and a signal synchronizing with the firing of an electronic flash. The photometer circuit 87 performs photometric processing based on an electric signal from the photometric sensor 63.

The nonvolatile memory 88 is a memory storing control parameters necessary for control of the camera as a storage area other than the SDRAM 83, the flash memory 84, and the recording medium 85. The nonvolatile memory 88 is accessible from the B μcom 80.

The LCD control panel 90 is to provide a display screen to the photographer to show the operating state of the camera. The camera operating-switch part 91 is a group of switches including operation buttons necessary to operate the camera such as the shutter release switches, a mode change switch, a power switch, etc. The second shutter release switch in the shutter release switches is not only to instruct shooting but also to switch the position of the first reflection mirror 51 between the inside and outside of the shooting optical path. The mode change switch is to switch over between the shooting mode and an image display mode. The power supply circuit 92 is provided for converting the voltage of the battery 93 as a power source and supplying a voltage necessary for each circuit unit of the camera system.

Figure 4:
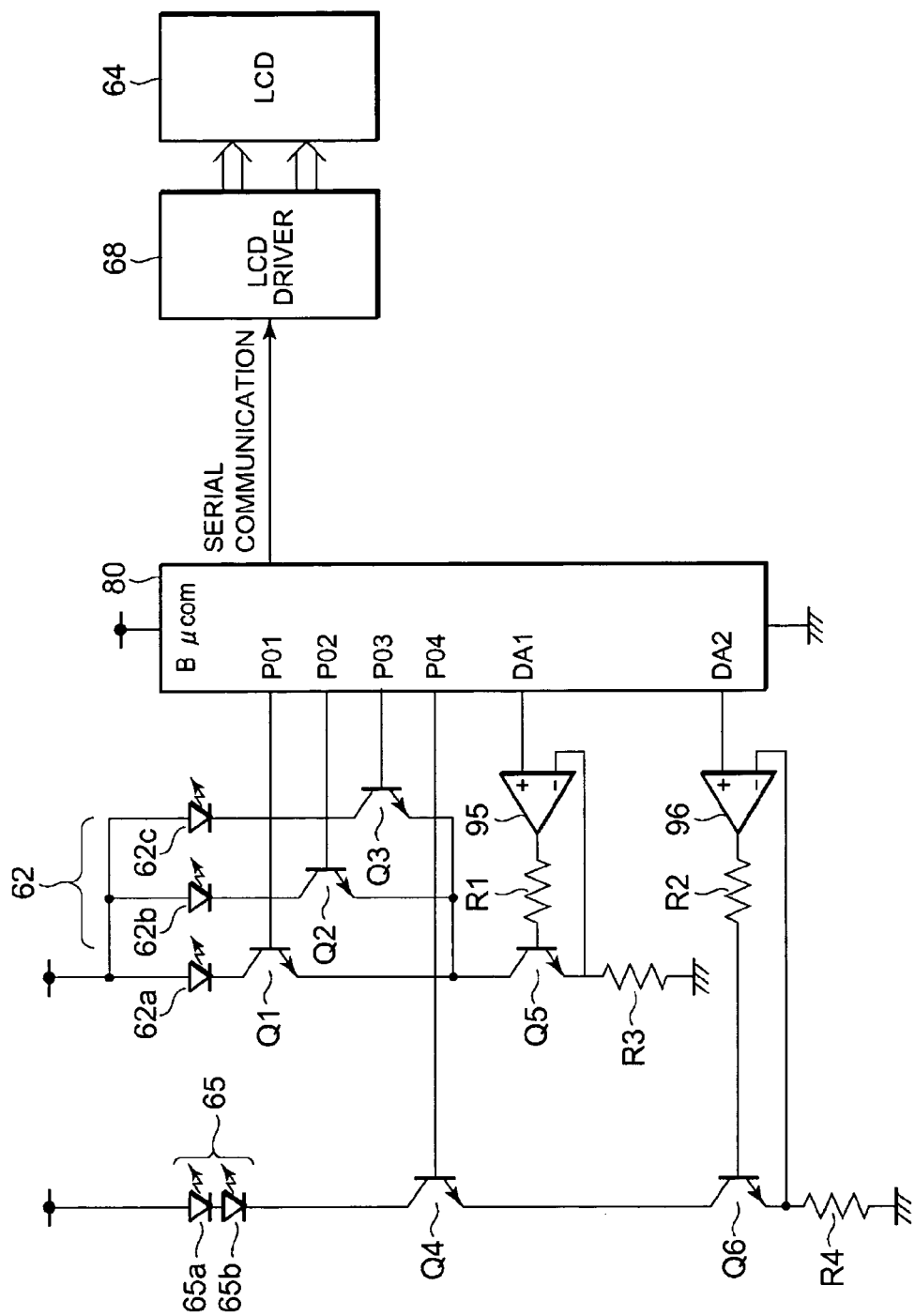
FIG. 4 is a circuit diagram showing the structure of a drive circuit for driving a set of focus point indicator LEDs 62 and a backlight LED unit 65.

FIG. 4 is a circuit diagram showing the structure of a drive circuit of the set of focus point indicator LEDs 62 and the backlight LED unit 65.

In this case, the set of focus point indicator LEDs 62 consists of three LEDs 62a, 62b, and 63c, which are selectively switched by switching transistors Q1, Q2, and Q3 in accordance with instructions from the ports P01, P02, and P03 of the B μcom 80, respectively. These LEDs 62a, 62b, and 62c are connected to a current control transistor Q5 through the transistors Q1, Q2, and Q3, respectively. Resistors R1, R3 and an operational amplifier 95 are connected to the transistor Q5. The transistor Q5 is controlled by the B μcom 80 through port DA1 (D/A converter) of the B μcom 80 so that the amount of current flowing through the focus point indicator LEDs 62 will be decided on to control the brightness of the LEDs 62.

On the other hand, the backlight LED unit 65 consists of two LEDs 65a and 65b, and the lighting of the backlight LED unit 65 is controlled by controlling a switching transistor Q4 in accordance with an instruction from port P04 of the B μcom 80. Similarly, the backlight LED unit 65 is connected to a current control transistor Q6 through the transistor Q4. Resistors R2, R4 and an operational amplifier 96 are connected to the transistor Q6. The transistor Q6 is controlled by the B μcom 80 through port DA2 (D/A converter) of the B μcom 80 so that the amount of current flowing through the backlight LED unit 65 will be decided on to control the brightness of the backlight LED unit 65.

The B μcom 80 sends various kinds of information to the LCD driver 68 via serial communication. The LCD driver 68 drives the LCD panel 64 in the viewfinder to display information sent from the B μcom 80.

FIGS. 5A and 5B show a display example in the viewfinder in the finder mode. FIG. 5A shows an example of a display screen 104 obtained by capturing the image on the focusing screen 56. FIG. 5B is an enlarged view of a display part 107 of the LCD panel 64 in the viewfinder.

As shown in FIG. 5A, the display screen 104 is a combined screen consisting of a display part 105 for displaying an image captured by the image pickup device 61 for live-view display and the display part 107 for displaying shooting information appearing on LCD display panel 64 in the viewfinder. AF frames 106 used for AF appear almost in the central portion of the display part 105. On the other hand, as shown in FIG. 5B, marks indicating various kinds of shooting information appear in the display part 107.

In FIG. 5B, reference numeral 110 denotes a mark indicating an aperture value, 111 is a mark indicating a shutter speed, 112 is an AF confirmation mark indicating that the subject is in-focus, 113 is a flash mark, 114 is a white balance mark, 115 is an AE lock mark, 116 is a mark indicating an exposure compensation value, 117 is a mark indicating an metering mode, 118 is a battery check mark indicating the amount of power remaining in the battery, and 119 is a mark indicating an exposure mode.

In the live view mode, a display screen corresponding to these display parts 105 and 107 appears in the LCD monitor 36, not in the viewfinder, as an image and shooting information.

FIG. 6 shows a display example in which only the exposure information is displayed in the LCD monitor 36.

In FIG. 6, reference numeral 121 denotes a battery check mark, 122 is a mark indicating an exposure mode, 123 is a mark indicating a shutter speed, 124 is a mark indicating an aperture value, 125 is a mark indicating an exposure compensation value, 126 is a noise reduction (noise removal) mark, 127 is an AE lock mark, 128 is a mark indicating a metering mode, and 129 is a part for an exposure compensation indicator and an exposure level indicator. Further, 131 is a part for indicating a flash mode and the like, 132 is a part for indicating an AF frame(s), 133 is a part for indicating a drive mode and the like, 134 is a part for indicating an image quality mode (record mode and pixel count) and the like, 135 is a mark indicating an ISO-equivalent sensitivity, 136 is a white balance mark, 137 is a part for indicating color settings and the like, and 138 is a mark indicating the remaining number of capturable pictures.

Figure 7:
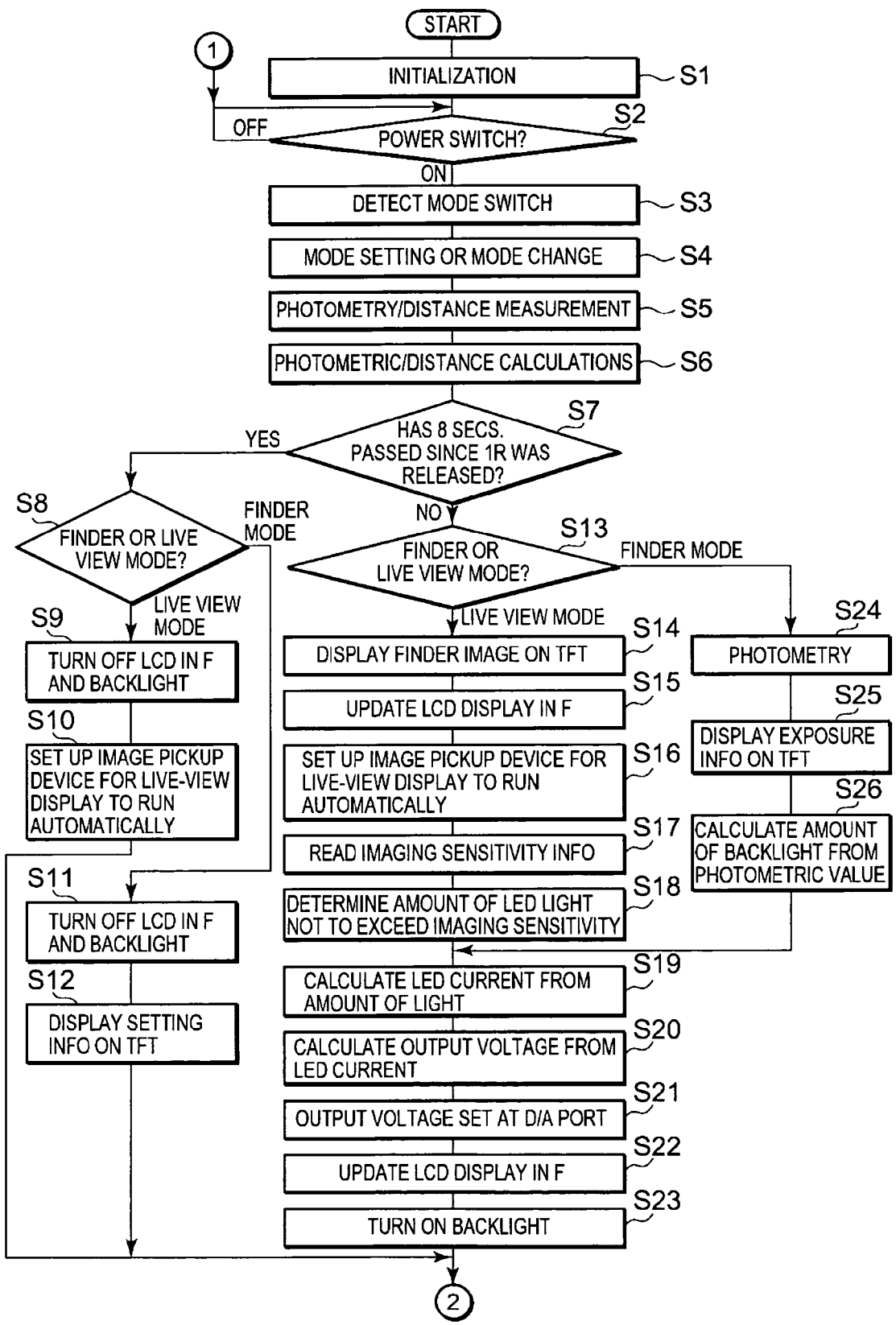
FIG. 7 is a flowchart for explaining a basic shooting operation of the camera according to the embodiment of the present invention.
Figure 8:
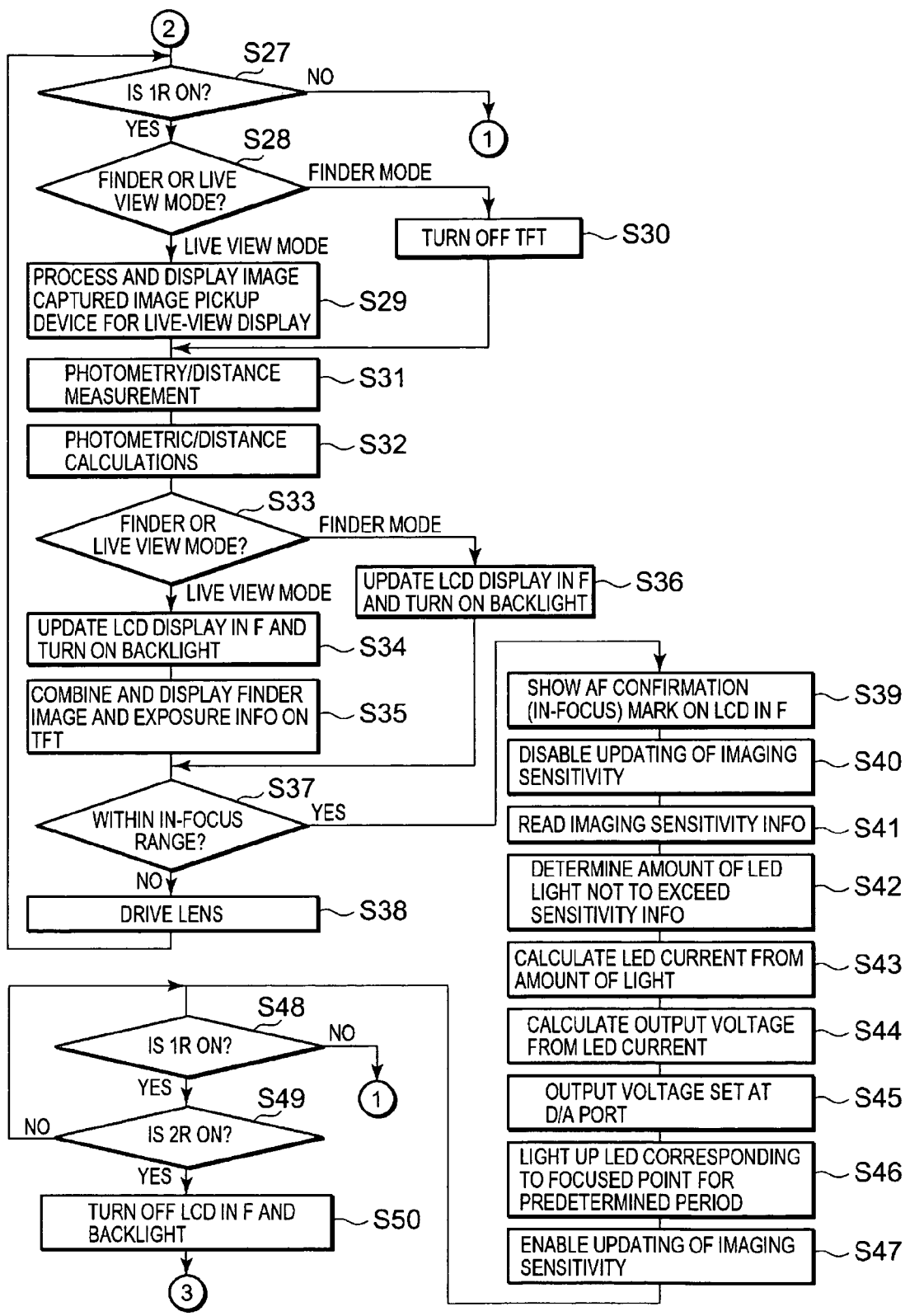
FIG. 8 is a flowchart for explaining the basic shooting operation of the camera according to the embodiment of the present invention.
Figure 9:
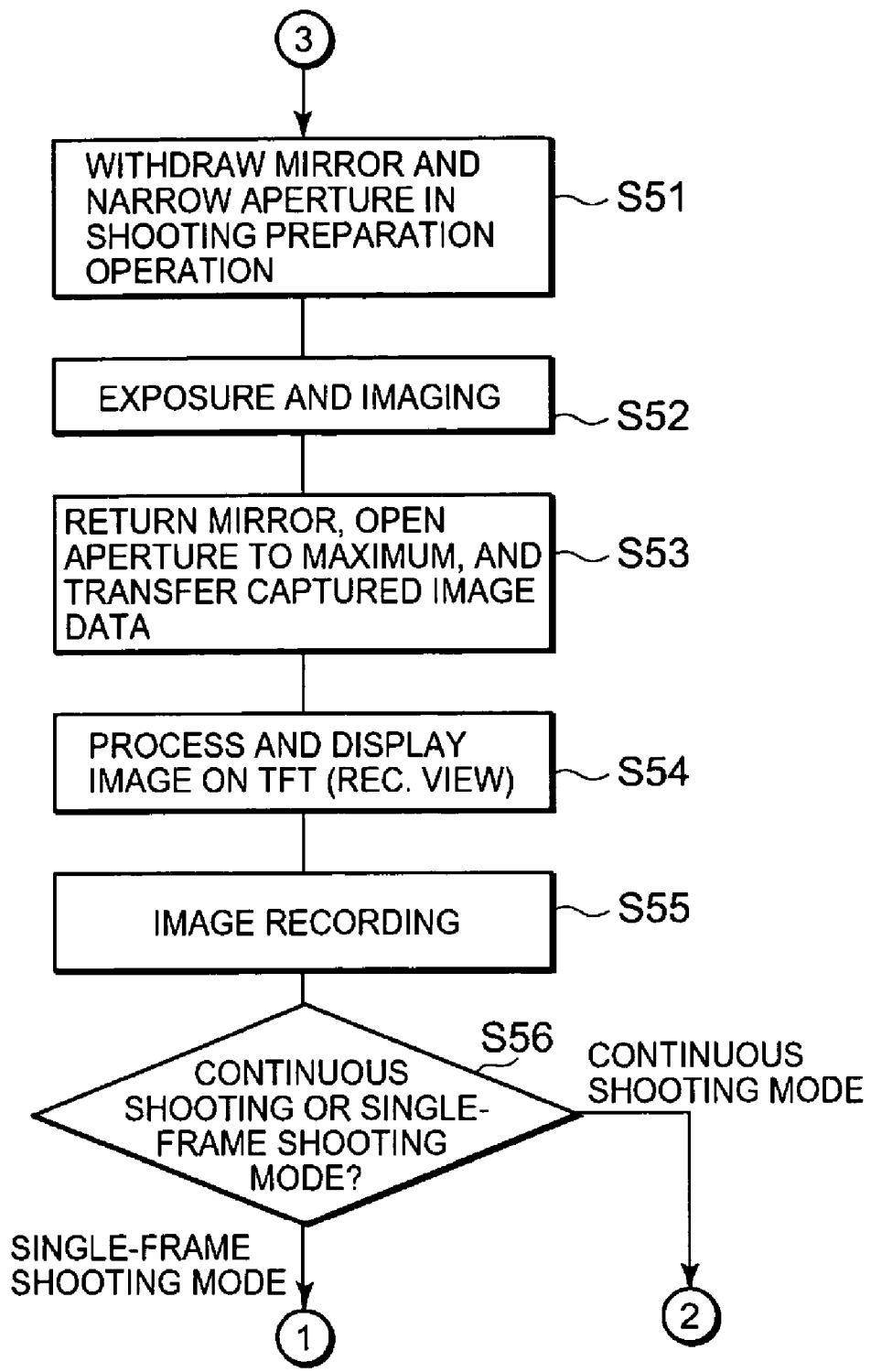
FIG. 9 is a flowchart for explaining the basic shooting operation of the camera according to the embodiment of the present invention.

The following describes the basic shooting operation of the camera according to the embodiment of the present invention with reference to flowcharts of FIGS. 7 to 9.

When the battery 93 in the camera body 30 is turned on to start the routine, the camera is first initialized in step S1. Then, in step S2, the operated state of the power switch lever 33 is detected. If the power switch lever 33 is operated to power on the camera, then the state of the mode switch is detected in the following step S3. As a result of the mode switch detection, the setting or change of a mode is made in step S4. In step S5, the photometric sensor 63 and the AF sensor unit 71 perform photometry and distance measurement, and in step S6, photometric and distance calculations are made based on the values obtained in step S5.

Then, in step S7, it is determined whether a predetermined period of time, eight seconds in the embodiment, has passed since the first shutter release switch was released. If eight seconds has passed, the procedure proceeds to step S8 to determine whether the display mode is the finder mode or live view mode. If it is the live view mode, the procedure proceeds to step S9 in which not only the display of the LCD panel 64 in the viewfinder but also the backlight LED unit 65 are turned off. Next, in step S10, the image pickup device 61 for live-view display is set up to run automatically. After that, the procedure shifts to step S27. On the other hand, if it is determined in step S8 that the display mode is the finder mode, the procedure shifts to step S11 in which not only the display of the LCD panel 64 in the viewfinder but also the backlight LED unit 65 are turned off. Then, in step S12, setting information is displayed on the LCD monitor (TFT) 36, and the procedure shifts to step S27.

In step S7, if the first shutter release switch is not released or eight seconds has not passed yet, the procedure shifts to step S13. In step S13, it is determined whether the display mode is the finder mode or live view mode. When it is determined that the display mode is the live view mode, the procedure proceeds to step S14 to display on the LCD monitor (TFT) 36 a finder image obtained from the image pickup device 61 for live-view display. Then, in step S15, the display contents of the LCD panel 64 in the viewfinder are updated. In step S16, the image pickup device 61 for live-view display is set up to run automatically. In step S17, imaging sensitivity information on the image pickup device 61 for live-view display is read, and in step S18, the amount of light emitted from the backlight LED unit 65 that falls in the range not to saturate the image pickup device 61 is calculated using the imaging sensitivity information.

On the other hand, if it is determined in step S13 that the display mode is the finder mode, the procedure shifts to step S24 in which the photometric sensor 63 performs photometry again. Next, in step S25, an exposure value is calculated based on the photometric value obtained in step S24 and resulting exposure information is displayed on the LCD monitor (TFT) 36. Further, in step S26, the amount of light emitted from the backlight LED unit 65 is calculated from the photometric value obtained in step S24.

In step S19, the amperage of current flowing through the backlight LED unit 65 is calculated from the photometric value calculated in step S18 or S26. Then, in step S20, the output voltage is calculated from the current flowing through the backlight LED unit 65 obtained in step S19. In step S21, the set voltage is output from the D/A port (DA2) of the B μcom 80. In step S22, the display contents of the LCD panel 64 in the viewfinder are updated. Then, in step S23, the backlight LED unit 65 is lit.

Next, in step S27, the state of the first shutter release (1R) switch of the shutter button 31 is detected. If the first shutter release switch is off-state, the procedure returns to step S2. On the other hand, if the first shutter release switch is on-state, the procedure proceeds to step S28 to determine whether the display mode is the finder mode or the live view mode. When the display mode is the live view mode, the procedure proceeds to step S29 to process and display on the LCD monitor 36 the image obtained from the image pickup device 61 for live-view display. On the other hand, when the display mode is the finder mode, the procedure shifts to step S30 to turn off the LCD monitor 36.

In step S31, the photometric sensor 63 and the AF sensor unit 71 perform photometry and distance measurement, and in the following step S32, photometric and distance calculations are made based on the values obtained in step S31. Then, in step S33, it is determined again whether the display mode is the finder mode or the live view mode. As a result, if the display mode is the live view mode, the procedure proceeds to step S34 to update the display contents of the LCD panel 64 in the viewfinder and turn on the backlight LED unit 65. Next, in step S35, the finder image and the exposure information are combined and displayed on the LCD monitor 36, and the procedure proceeds to step S37. On the other hand, if it is determined in step S33 that the display mode is the finder mode, the procedure shifts to step S36 to update the display contents of the LCD panel 64 in the viewfinder and turn on the backlight LED unit 65. After that, the procedure proceeds to step S37.

In step S37, it is determined whether the photographing lens 11 is within the in-focus range. As a result, if it is not within the in-focus range, the procedure proceeds to step S38 to drive the photographing lens 11 through the lens drive mechanism 13 or the like. After that, the procedure returns to step S27 to repeat the above-mentioned operations. On the other hand, if it is determined in step S37 that the photographing lens 11 is within the in-focus range, the procedure shifts to step S39 to show the AF confirmation mark 112 on the LCD panel 64 in the viewfinder to indicate that the subject is in-focus. Next, in step S40, updating of the imaging sensitivity of the image pickup device 61 for live-view display is disabled. Then, in step S41, the imaging sensitivity information on the image pickup device 61 for live-view display is read out.

In step S42, the amount of light emitted from the focus point indicator LEDs 62 that falls in the range that does not saturate the image pickup device 61 using the imaging sensitivity information read out in step S41 is calculated. Then, in step S43, the amperage of current flowing through the focus point indicator LEDs 62 is calculated from the amount of light obtained in step S42. Further, in step S44, the output voltage of the B μcom 80 is calculated from the LED current obtained in step S43. In step S45, the set voltage is output from the D/A port of the B μcom 80.

In step S46, one of the focus point indicator LEDs 62a-62c is lit for a predetermined period of time to light up a corresponding focus point. In the following step S47, updating of the imaging sensitivity of the image pickup device 61 for live-view display is enabled. This is to prevent the brightness of the screen from being decreased due to the fact that, when an LED is lit, the light emitted from the LED is fed back to control the brightness of the screen. Since the updating of the imaging sensitivity is enabled, the brightness of the screen can be adjusted to the correct exposure to fit the brightness of the image captured.

Next, in steps S48 and S49, the states of the first and second shutter release switches are detected. Here, the camera waits until the first shutter release switch and the second shutter release switch are turned on. If the first shutter release switch is turned off, the procedure returns to step S2. On the other hand, if the first shutter release switch and the second shutter release switch are both turned on, the procedure proceeds to step S50 to turn off the LCD panel 64 in the viewfinder. Along with the turning off the LCD panel 64, the backlight LED unit 65 is also turned off.

In step S51, the first reflection mirror 51 is withdrawn out of the photographing optical path, and the aperture 12 is narrowed in the shooting preparation operation. In the following step S52, the image pickup device 67 for image capturing performs imaging. After completion of the imaging operation, the procedure proceeds to step S53, in which the first reflection mirror 51 is returned to the photographing optical path, the aperture 12 is opened to the maximum, and the image captured by the image pickup device 67 for image capturing is transferred to the image processing controller 82 through the interface circuit 81. In step S54, the image captured is processed through the image processing controller 82, and the processed image is displayed on the LCD monitor 36. Next, in step S55, image data of the processed image is recorded on the recording medium 85. After that, in step S56, it is determined whether the shooting mode is a continuous shooting mode or a single-frame shooting mode. As a result, if the shooting mode is the single-frame shooting mode, the procedure returns to step S2, while if it is the continuous shooting mode, the procedure returns to step S27. In both cases, the sequence of operations that follow step S2 or S27 are repeated.

As described above, the amounts of LED light (in the embodiment, the amounts of light emitted from the backlight LED unit 65 and the focus point indicator LEDs 62) can be adjusted. This can prevent the shooting information and the like from being difficult to see, providing a finder device and a camera having an easy-to-use, high-grade live-view display function.

While there has been shown and described what is considered to be a preferred embodiment of the invention, it will, of course, be understood that various modifications and changes in form or detail could readily be made without departing from the spirit of the invention. It is therefore intended that the invention not be limited to the exact form described and illustrated, but constructed to cover all modifications that may fall within the scope of the appended claims.

What is claimed is:

1. A finder device comprising:
    a mat screen arranged in a finder optical path on which a subject image is formed;
    an imaging section for acquiring a finder image including the subject image on the mat screen;
    an image display section for displaying image data acquired by the imaging section; and
    a light-emitting display section arranged in the finder,
    wherein the light-emitting display section can adjust the amount of light emitted therefrom so that the light-receiving level of the imaging section is not saturated during the light-emitting display,
    wherein the imaging section has a function for adjusting its imaging sensitivity automatically according to the brightness of the subject, and the light-emitting display section adjusts the amount of light emitted therefrom according to the imaging sensitivity of the imaging section, and
    wherein the imaging section stops automatic adjustment of the imaging sensitivity during the light-emitting display operation of the light-emitting display section.

2. The finder device according to claim 1, wherein the light-emitting display section includes a LED for projecting light onto the mat screen and a drive circuit that can adjust the amount of LED light.

3. The finder device according to claim 1, wherein, the light-emitting display section includes an LCD display unit provided adjacent to the mat screen and a backlight unit that can adjust the amount of light for the LCD display unit.

4. A camera comprising the finder device according to claim 1.

5. A finder device comprising:
    a mat screen arranged in a finder optical path on which a subject image is formed;
    an imaging device for repeatedly capturing a finder image including the subject image on the mat screen;
    an image display device for displaying image data output from the imaging device that adjusts its imaging sensitivity automatically according to the brightness of the subject; and
    a light-emitting display device, arranged in the finder, which adjusts the amount of light emitted therefrom according to the imaging sensitivity of the imaging device,
    wherein the imaging device stops automatic adjustment of the imaging sensitivity during the light-emitting display operation of the light-emitting display device.

6. The finder device according to claim 5, wherein the light-emitting display device includes
    a LED for projecting light onto the mat screen, and
    a drive circuit that can adjust the amount of LED light.

7. The finder device according to claim 5, wherein the light-emitting display device includes
    an LCD display unit provided adjacent to the mat screen, and
    a backlight unit that can adjust the amount of light for the LCD display unit.

8. A camera comprising the finder device according to claim 5.

9. A camera comprising:
    a mat screen arranged in a finder optical path on which a subject image is formed;
    an imaging section for acquiring a finder image including the subject image on the mat screen;
    an image display section for displaying image data acquired by the imaging section;
    a light-emitting display section arranged in the finder optical path to cause an information display;
    a finder optical system for allowing a user to observe the subject image on the mat screen and the information displayed by the light-emitting display section; and
    a control section for controlling the amount of light so that the light-receiving level of the imaging section is not saturated during the light-emitting display operation of the light-emitting display section,
    wherein the imaging section has a function for adjusting its imaging sensitivity automatically according to the brightness of the subject, and the control section adjusts the amount of light to be emitted from the light emitting display section according to the imaging sensitivity of the imaging section,
    wherein the imaging section stops automatic adjustment of the imaging sensitivity during the light-emitting display.

10. The camera according to claim 9, wherein the light-emitting display section includes a LED for projecting light onto the mat screen and a drive circuit that can adjust the amount of LED light.

11. The camera according to claim 9, wherein the light-emitting display section includes an LCD display unit provided adjacent to the mat screen and a backlight unit that can adjust the amount of light for the LCD display unit.

* * * * *